United States Patent [19]

Herbort et al.

[11] Patent Number: 4,741,885

[45] Date of Patent: May 3, 1988

[54] VESSEL FOR THE GENERATION OF SYNTHESIS GAS

[75] Inventors: Hans-Joachim Herbort, Frondenberg; Hans-Dieter Marsch, Dortmund, both of Fed. Rep. of Germany

[73] Assignee: Uhde GmbH, Dortmund, Del.X

[21] Appl. No.: 905,120

[22] Filed: Sep. 9, 1986

[30] Foreign Application Priority Data

Sep. 11, 1985 [DE] Fed. Rep. of Germany ....... 3532413

[51] Int. Cl.$^4$ ............................................... B01J 8/04
[52] U.S. Cl. .................................... 422/197; 422/196; 422/202
[58] Field of Search ................ 422/197, 196, 202, 158

[56] References Cited

U.S. PATENT DOCUMENTS

| | | | |
|---|---|---|---|
| 2,029,604 | 2/1936 | Bayer et al. | 422/197 |
| 2,345,423 | 3/1944 | Punnmuller et al. | 422/197 |
| 2,579,843 | 12/1951 | Mader | 422/197 |
| 3,490,869 | 1/1970 | Heller . | |
| 3,701,827 | 10/1972 | Dahmen . | |
| 4,391,789 | 7/1983 | Estopiral . | |

*Primary Examiner*—Barry S. Richman
*Assistant Examiner*—William R. Johnson
*Attorney, Agent, or Firm*—Toren, McGeady & Associates

[57] ABSTRACT

A vessel for the generation of synthesis gas at a high pressure, using hydrocarbons, includes a catalytic endothermic reforming section with a plurality of reformer tubes heated externally and filled with a catalyst, and a mixture of hydrocarbons and steam entering the reformer tubes which are positioned by a common plate. The reforming gas generated in the tubes flows from the tubed section into a partial oxidation section which has a larger diameter than the tubed section and the shape of a pressure vessel closed at one end, the free ends of the reformer tubes penetrating into the partial oxidation section, and in which inlet gas such as additional hydrocarbons and oxygen or oxygen-rich gas are mixed with the reforming gas. A plurality of inlet devices for the inlet gas are positioned in the cylindrical shell of the partial oxidation section with the axes of the gas flow streams being inclined away from the radial. The inlet devices are spaced a predetermined distance from the outlet end of the reformer tubes such that a rotary gas vortex is produced and the product gas stream flows through the outer section of the chamber, heats the reformer tubes and leaves the reforming section via an outlet nozzle.

15 Claims, 4 Drawing Sheets

VESSEL FOR THE GENERATION OF SYNTHESIS GAS

BACKGROUND OF THE INVENTION

The invention relates to a vessel for the generation of synthesis gas at a high pressure (thirty bar or more), using hydrocarbons, particularly natural gas, naphtha and/or refinery gas in a catalytic endothermic reforming section with a cylindrical pressure vessel and a plurality of reformer tubes heated externally and filled with a catalyst, and a mixture of hydrocarbons and water vapor entering the reformer tubes which are positioned by means of a common plate. The reforming gas generated in said tubes flows from the tubed section into a partial oxidation section in which hydrocarbons and oxygen or oxygen-rich gas are admixed. The oxidation section has the shape of a pressure vessel closed at one end, with the reformer tubes penetrating into said section.

The synthesis gas which mainly contains hydrogen and carbon monoxides is the raw material for a number of commercial-scale synthesis plants such as methanol or ammonia plants. It is also possible to produce pure hydrogen, provided the synthesis gas is subjected to an appropriate treatment.

Vessels for synthesis gas generation are known, in which the following process steps are used:
catalytic endothermic steam reforming (I) and
partial autothermic oxidation (II)
and in which the reformer tubes filled with a catalyst are heated with hot reaction gas generated in partial oxidation step II.

West German Pat. No. 32 44 252, for example, describes a vessel in which a first stream of hydrocarbons is mixed with steam and subjected to the steam reforming reaction in the reformer tubes filled with a catalyst. The process gas generated in this reaction step leaves the reformer tubes suspended perpendicularly in a cylindrical brick-lined vessel and then enters an untubed chamber under the reformer tube ends which is referred to as the mixing chamber. The temperature of the gas leaving reaction step I is normally over 700° C. The second stream of hydrocarbons, which need not have the parameters of the first stream (quantity, etc.), is fed to said chamber, thereby admixing oxygen or oxygen-rich gas. The gases react with each other (reaction step II). The gases in the immediate vicinity of the above mentioned reactants also take part in the step II reaction.

The temperature of the gas generated in reaction step II is approximately 1400° to 2100° C. and, consequently, it exceeds considerably the temperature of the gas generated in reaction step I. The gas streams from reaction steps I and II should be thoroughly mixed in the mixing chamber until the mixture has a uniform temperature. The equilibrium reactions taking place simultaneously are called reaction step III, the temperature being in excess of 950° C., preferably 1100° C., and governing the synthesis gas composition. This gas flows in a counter-current to the gases generated in reaction step I and enters the tubed part of the catalytic reforming section, the tubes of which are heated to the temperature required for reaction step I.

The gas generated in reaction step I has a high residual methane content while the gas stream from step II contains only traces of methane. The gas stream from reaction step III has a target methane content which is compatible with the reaction temperature, for example less than 1%, preferably less than 0.5%. However, this reaction temperature and the gas composition which can be calculated on this basis can only be achieved if the gas streams from reaction steps I and II are completely mixed, i.e. leaving no gas striae. In order to ensure an optimum performance, it is imperative that the gases be completely mixed prior to entering the cooling section (tubed reforming section). The device described in patent No. 32 44 252 does not ensure an appropriate mixing of the gas streams.

Another vessel is known from U.S. Reissue Pat. No. 24,311, in which the hydrocarbons are mixed with steam and then subjected to a limited catalytic endothermic steam reforming process which takes place in a cylindrical pressure vessel equipped with reformer tubes partly filled with a catalyst. Oxygen-carrying tubes are installed in the center of the reformer tubes. At the outlet of said tubes, the partly reformed hydrocarbons are mixed with heated oxygen and subjected to a simultaneous partial autothermic oxidation. The lower part of the cylindrical pressure vessel is an untubed reaction chamber in which the reaction gases return at the chamber bottom in order to flow upwards and to heat the reformer tubes. From the technological and metallurgical point of view, it is very difficult to mount the oxygen-carrying tubes in the center of the hot reformer tubes and, as a result, this device has never been constructed. Moreover, the design does not permit universal application for various raw materials and is not suitable for the treatment of hydrocarbons in two reaction steps.

SUMMARY OF THE INVENTION

An object of the present invention is to design a vessel which is suitable for the required thermal reactions, which provides reliable operation and complete reactions and which permits a control of the reaction steps such that synthesis gases having different compositions can be generated.

The advantages of the invention are that the partial oxidation section, i.e. the mixing chamber, provides stable flow conditions. The reactants such as reforming gas, additional hydrocarbons and oxygen or oxygen-rich gas are injected in such a manner that a vortex generally coaxial with the vessel longitudinal axis is produced in the mixing chamber and that a low-pressure area forms in the center of said vortex, whereby the reforming gas is withdrawn from the reformer tubes and forced into the lower part of the mixing chamber. This configuration permits a thorough mixing of the reforming gas and gas stream from the partial oxidation section for the generation of synthesis gas, using special inlet devices. The main stream of the gas mixture or synthesis gas in the outer section of the vortex leaves the untubed space between the inlet devices in the partial oxidation section and enters the reforming section. The hot synthesis gas stream heats the reformer tubes and the mixture in the tubes to the temperature required for the endothermic reaction.

The vessel described above operates properly, irrespective of the position of the reforming section which may be arranged upstream or downstream of the partial oxidation section. It is essential that certain technical requirements be met, taking into account the gas to be processed. The pitch "t" of the opening in the plane of the reformer tube outlets, for example, must comply with the following formula:

t is less than or equal to d+(0.317×h)

Thus, the gas stream cannot return into the tubed section. The factors d and h are defined as follows:

h= =(m$_1$/m$_o$)(ρ$_o$/ρ$_1$) (d/0.32)

where:
m$_o$ is the mass of the steam from an opening in the plane of the reformer tube outlets.
m$_1$ is the mass of the gas stream produced with the aid of m$_o$.
ρ$_1$ and ρ$_o$ are the densities of the steams involved.
d is the diameter of the opening in the plane of the reformer tube outlets.

The Reynolds numbers for the individual streams from the reformer tube outlets should be greater than $5 \times 10^3$, preferably greater than $5 \times 10^4$. The impulses resulting from these flow conditions permit a penetration of the gas streams through the vortex into the lower part of the mixing chamber, producing a rotary vortex ring which is required for the spiral return flow of the gases in the outer section of the mixing chamber.

The Reynolds numbers for the inlet devices (nozzle outlet) should be $4 \times 10^3$, preferably $4 \times 10^4$. It is calculated on the basis of an assumed outlet velocity, an assumed diameter and the mean viscosity of the gases concerned, said numbers being based on the uniformity of impulses and streams and on the design of the nozzle ends of the inlet devices pointing towards the mixing chamber.

The flow parameters of the injected fluids must always be stable. If the inlet flow rate is varied in this case (this function is indispensable for load variations and for the control of the product gas composition), the flow conditions in the mixing chamber are not changed and the mixing process is not affected. The plus sign in the above equation represents a deviation from the horizontal axis of the mixing chamber, i.e. the inlet devices are inclined towards the reformer tube sections.

An adequate residence time of the reactants in the mixing chamber is required to ensure a close approach to the equilibrium of reaction step III. According to the invention, the depth of the chamber which has a given diameter is selected such that the minimum residence time is four seconds. The mixing chamber diameter should be 1.1 times the diameter of the enveloping circle of the tubed section, said diameter being reduced in the tubed part of the vessel. This configuration permits a radial upward product gas stream from reaction step III into the tubed section. Thus, the product gas does not come into contact with the gases generated in reaction step I. If the chamber diameter exceeds a certain limit, the flow pattern cannot be maintained.

It is also known that the synthesis gas generated in reaction step III tends to change its composition when cooling slowly, i.e. the methane content increases as the equilibrium conditions change. The effect of this reforming step would partly be lost in such a case. Therefore, it is imperative that the product gas which has the required equilibrium be cooled as quickly as possible in order to preserve the state of the product gas. Experience has shown that said conditions can be stabilized at temperatures of less than 600° C.

In order to achieve a uniform and efficient heating of the reformer tubes with the aid of the hot synthesis gas, adequate gas cooling is provided. The formation of methane and carbon deposits is avoided. Therefore, the reformer tubes are jacketed at a certain distance from the outlet of the reformer tubes. The hot synthesis gas flows through the annular spaces between the tube jackets and the reformer tubes.

Furthermore, the inventive vessel permits the application of a conventional process, using the catalytic reaction as the last step for the synthesis gas generation. The space between the outlet ends of the reformer tubes is filled with a catalyst such that the synthesis gas entering this section passes the catalyst bed. This downstream catalytic autothermic reaction step permits a closer approach to methane equilibrium, thus reducing the residual methane content of the synthesis gas, i.e. the synthesis gas stream from the upstream reaction steps has a lower temperature.

A further advantage of the catalyst bed mentioned above is that it compensates for an insufficient mixture and/or reaction of the gas passing the catalyst bed. A section with an inert packing and a special supporting structure for the reformer tube jackets can be arranged downstream of the catalyst bed.

The invention does not relate to the design of the outlet ends or nozzles of the reformer tubes. Any state-of-the-art configuration may be selected for this part.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
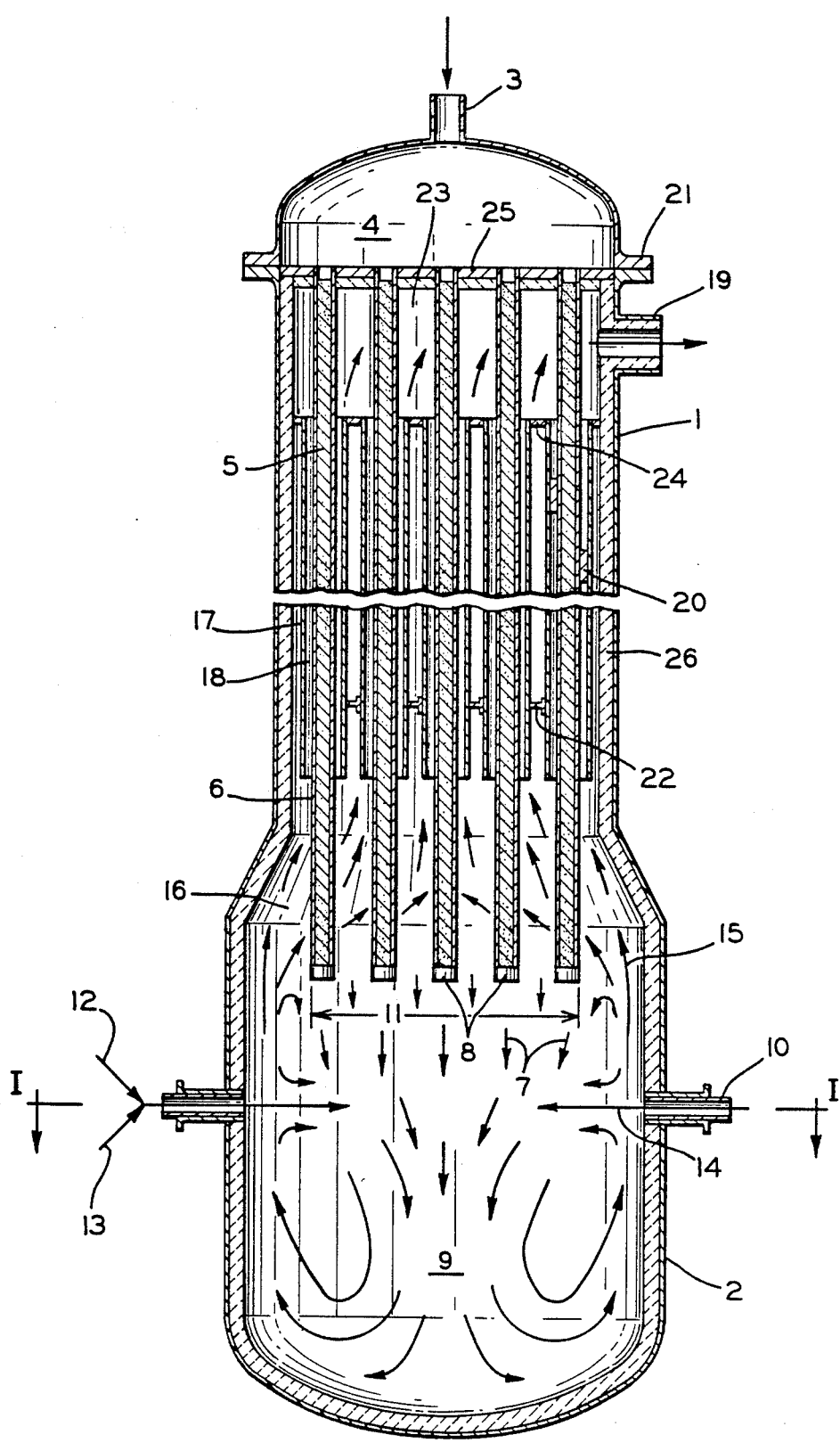
FIG. 1 is a cross section of a reactor with suspended reformer tubes according to the present invention.

The reactor in FIG. 1 consists of reforming section 1 and oxidation section 2 for partial oxidation. The first stream of hydrocarbons mixed with steam enters chamber 4 of the reforming section 1 via inlet nozzle 3 and is distributed such that it flows through reformer tubes 6 filled with a catalyst 5. The tubes are heated and the catalytic steam reforming reaction takes place, i.e. reaction step I. The reforming gas 7 generated in reaction step I leaves the reformer tubes via nozzles 8 and enters mixing chamber 9 at a high flow rate. Said flow rate as well as the pitch, diameter and position of nozzles 8 are of major importance for the required distance between the position of the nozzles and the position of inlet devices 10. The outlet flow rate, the nozzle diameter and the position of inlet devices 10 in conjunction with the ratio of the diameter of mixing chamber 9 and the diameter of the enveloping circle 11 of reformer tubes 6 are crucial for the required flow conditions marked with arrows in FIGS. 1, 2, 3 and 4. An adequate axial size of mixing chamber 9 ensures the required residence time of the reactants.

The fluids such as oxidizer 12 and the second stream of hydrocarbons 13, which are injected via inlet devices 10 and which may also contain steam, react with each other and with the ambient gases in the form of a partial oxidation. The inlet parameters related to the fluids (i.e. direction, velocity and quantity) are such that a vertical vortex is produced in mixing chamber 9, said vortex having a low-pressure center. The defined positions of inlet devices 10 and nozzles 8 are crucial for the formation of a vortex which permits a permanent stream of reforming gas from nozzles 8 to the lower part of the mixing chamber. Thus, reforming gas 7 and oxidation gas 14 are constantly mixed and react with each other. This gas mixture flows downwards in a spiral stream, returns at the bottom of the mixing chamber and is forced upwards in a spiral stream to the tubed reaction part. Synthesis gas forms in annular space 16 between the reactor wall and the tubed reforming section and flows in an upward radial pattern to the tubed section.

Annular space 16 is tapered in the section adjacent the unjacketed reformer tubes and is designed such that gases 15 can enter this area without coming into contact with gases 7. In this area, the radiation heat of synthesis gas 15 is used for heating reformer tubes 6. When the gases have entered the reformer tube jackets 17, the heat is transferred onto the reformer tubes in a convective manner. Annular spaces 18 between tube jackets 17 and reformer tubes 6 are sized such that synthesis gas 15 is cooled in the shortest possible period. The selected velocity of the gas permits an adequate heat transfer onto the reformer tubes so that synthesis gas 15 leaves the vessel via nozzle 19 at the lowest possible temperature. The size of annular spaces 18 is adjusted by means of spacers 20 such as helix components, rails parallel to the vessel axis, wires or cam rings. In order to achieve a uniform synthesis gas distribution for annular spaces 18, the external surfaces of the reformer tubes and the internal surfaces of the tube jackets 17 are smoothened to facilitate the flow in the annular spaces. Spacers 20 are designed such that the reformer tubes and the jackets can compensate for different thermal expansion. Moreover, said spacers permit the removal of individual tubes from the jackets after removing flanged head 21.

The tube jackets 17 are jointly supported by means of spacers 22 mounted in one plane, said spacers permitting expansion of individual tube jackets. Tube jackets 17 are open at the end of partial oxidation section 2 or mixing chamber 9 and at the end of outlet chamber 23, thus reducing the pressure acting on partition plate 24. Partition wall 25 is the reformer tube sheet.

Since the temperatures are very high in both reactor sections, said components have refractory lining 26. The liner surface which comes into contact with the hot gas should not contain $SiO_2$ because of the reducing gas atmosphere. In order to protect the jackets against too high temperatures, for example in the event of an emergency, the vessel may be equipped with a conventional water-cooled jacket or sprinkler system (not shown).

Figure 2:
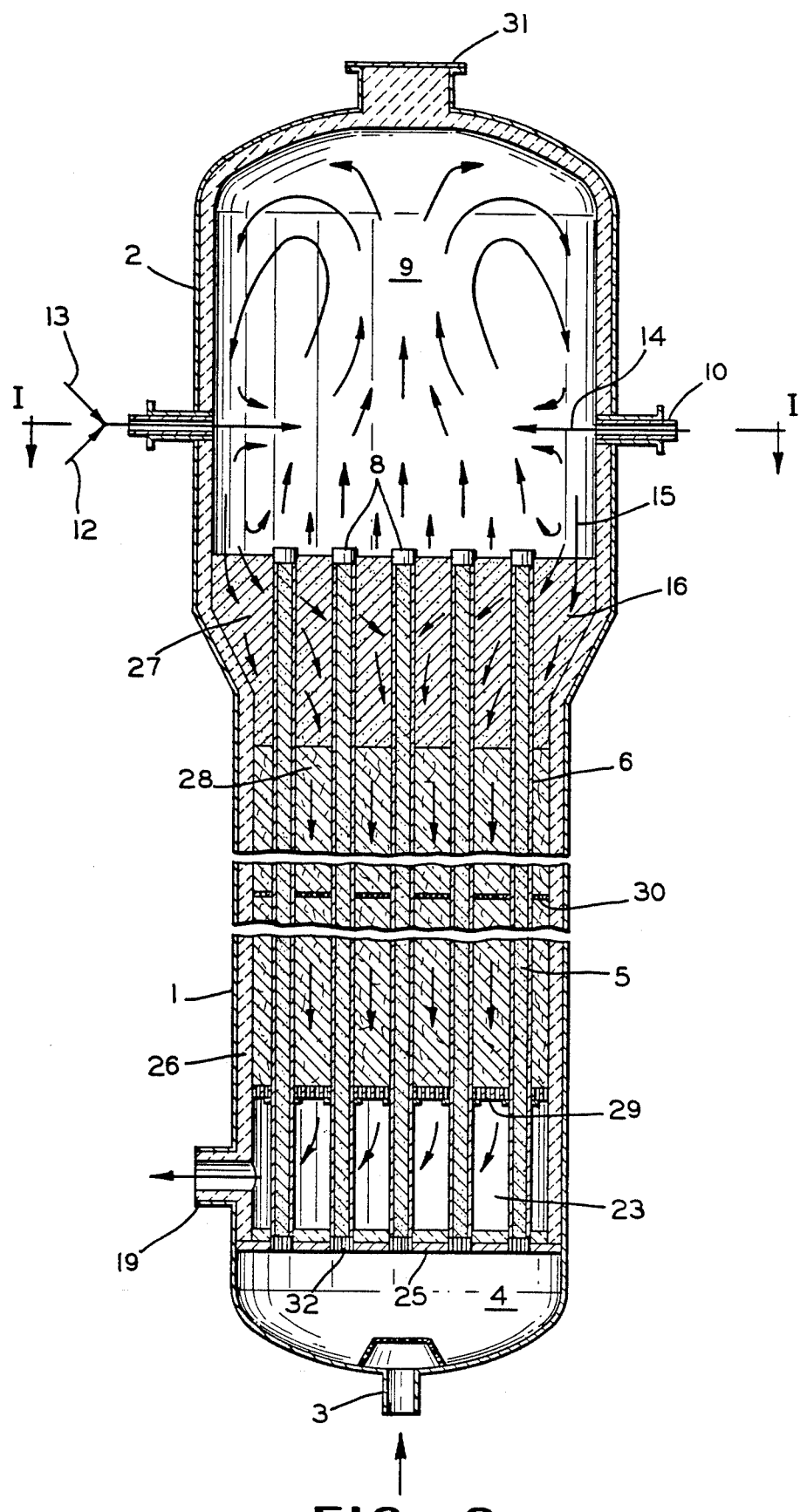
FIG. 2 is a cross section of a reactor with supported reformer tubes according to another embodiment of the present invention.

The vessel shown in FIG. 1 has suspended reformer tubes 6 and the partial oxidation section 2 is on the lower side. If the catalyst grid is arranged at the reformer tube inlet, it is possible to operate the vessel in a reversed mode. A further embodiment of the invention is shown in FIG. 2. In this case, the first stream of hydrocarbons mixed with steam enters chamber 4 via inlet nozzle 3 and is distributed such that it is forced into the tubes 6 filled with catalyst 5. The tubes are heated and the catalytic reforming reaction takes place, i.e. reaction step I. Gas 7 generated in reaction step I enters mixing chamber 9 via nozzles 8 at a high velocity. Said outlet flow rate as well as the pitch, diameter and position of nozzles 8 are of major importance for the distance between the position of nozzle 8 and the positions of inlet devices 10. The outlet velocity, the nozzle diameter and position of inlet devices 10 in conjunction with the ratio of the diameter of mixing chamber 9 and the diameter of the enveloping circle of the reformer tubes 6 are crucial for the required flow conditions marked with arrows in FIGS. 2 and 3. An adequate axial size of the mixing chamber ensures the residence time required for the reactants.

The fluids such as oxidizer 12 and the second stream of hydrocarbons 13, which are injected via inlet device 10 and which may also contain steam, react with each other and with the ambient gases, i.e. gas 14 forms in reaction step II. The inlet parameters for the fluids (i.e. direction, velocity and quantity) are such that a vertical vortex is produced in mixing chamber 9, said vortex having a low-pressure area in the center. The defined positions of inlet devices 10 and nozzles 8 are crucial for the formation of a vortex which permits a permanent stream of gas 7 from nozzles 8 to the lower part of the mixing chamber so that gases 7 and 14 are constantly mixed and react with each other. This gas mixture returns in a spiral stream through the outer section of the mixing chamber to the tubed reactor part and is forced through the catalyst bed in annular space 16 between the reactor wall and the tubed reactor section.

The catalyst permits a closer approach to the methane equilibrium, thus reducing the residual methane content of the gas. In addition to the heat required for this reaction (IV), the gas also supplies the heat for reformer tubes 6 in the catalyst bed. The heat transferred onto the reformer tubes in this section may be generated to meet the requirement of reaction step IV., for example by providing an internal and external insulation and/or by reducing the tube diameter, by selecting an adequate reformer tube pitch, by adequately sizing the annular space 16 and/or the catalyst volume. The hot gas from catalyst bed 27 passes a layer of noncatalytic bulk material (packing 28) and dissipates further heat to the reformer tubes. The cooled product gas passes the perforated wall 29, enters outlet chamber 23 and is discharged via nozzle 19. By selecting an adequate shape and material for packing 28, it is possible to achieve the required heat transfer as well as the necessary cooling time. The means indicated below are also suitable for this objective, for example reformer tube pitch, use of large displacers, and use of reformer tubes with larger surfaces.

Catalyst bed 27 is in the section above packing 28 supported by perforated plate 29. This plate is placed on the clips of reformer tubes 6 but it is also possible to attach the clips to partition wall 25 or to the reactor wall. Reformer tubes 6 are positioned by means of at least one perforated and sectionalized spacer plate 30 such that each tube has sufficient clearance for thermal expansion. Said plate is supported by packing 28. This vessel configuration requires no head flange 21 as in the case of the vessel in FIG. 1. Catalysts 5 and 27 and packing 28 can be withdrawn through a manhole 31. Catalyst 5 can also be removed through a manhole (not shown) in chamber 4 if the catalyst grid 32 is detachable.

Figure 3:
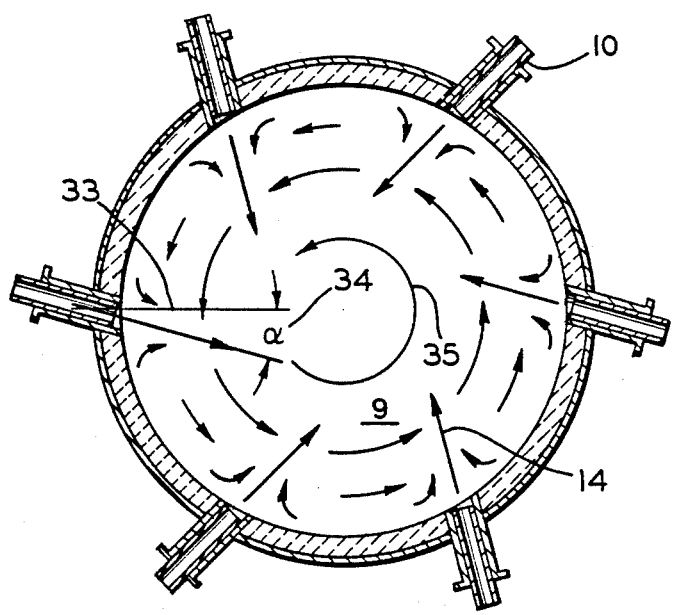
FIG. 3 is a horizontal cross section of the reactor inlet devices of FIGS. 1 and 2.

FIG. 3 shows a horizontal cross section of the vessel according to FIGS. 1 and 2, along section line I—I. Six inlet devices 10 are equally spaced in the shell of mixing chamber 9 and are directed such that the gas streams from the inlet nozzles (marked as streams 14) and their center-lines or longitudinal axes deviate from a radial 33 of the chamber 9 to form angle alpha 34. The gas streams 14 generate the required vortex 35 marked with arrows. The angle 34 can be in the range of 1° to 30° but preferably is in the range of 5° to 20°.

Figure 4:
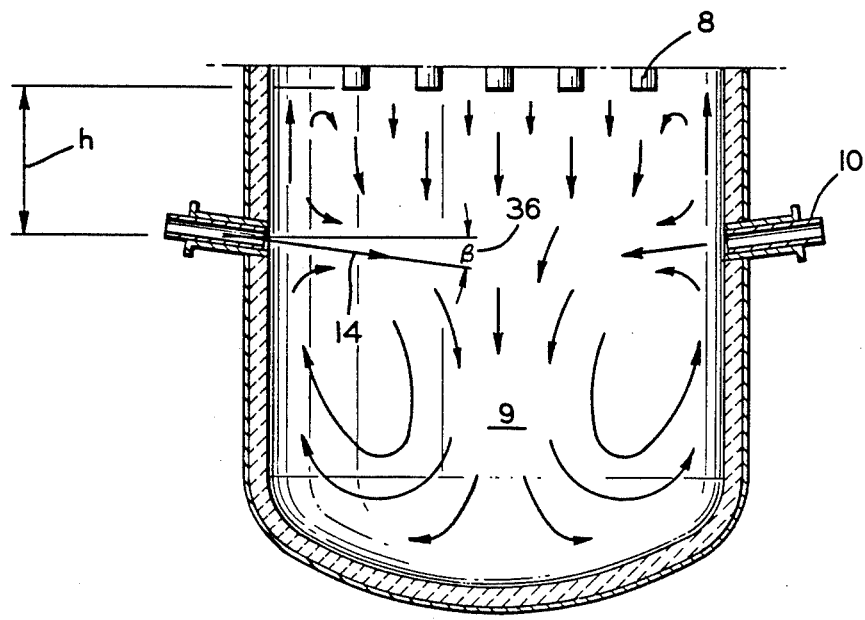
FIG. 4 is a vertical cross section of the mixing chamber of FIGS. 1 and 2 with inclined inlet devices according to the present invention.

FIG. 4 is a vertical cross section of mixing chamber 9 of the vessel according to FIGS. 1 and 2. Gas streams 14 are inclined, i.e. angle beta 36 indicates the inclination of the stream in relation to the horizontal plane of mixing chamber 9. Typically, angle 36 can be in the range of +5° (toward the outlets 8) to −15° (away from the outlets 8) and preferably in the range of 0° to −10°. The nozzles of inlet devices 10 form a plane related to all horizontal axes. The distance "h" between this plane and the plane related to the nozzles of the reformer tube outlets 8 is crucial for the flow pattern marked with arrows in the drawing, vortex 35 shown in FIG. 3 overlapping said pattern. Typically, the distance "h" is in the range of 0.15 to 1.0 times the diameter of the enveloping circle 11. If required, inlet devices 10 may be installed at different levels to form the necessary planes.

Figure 5:
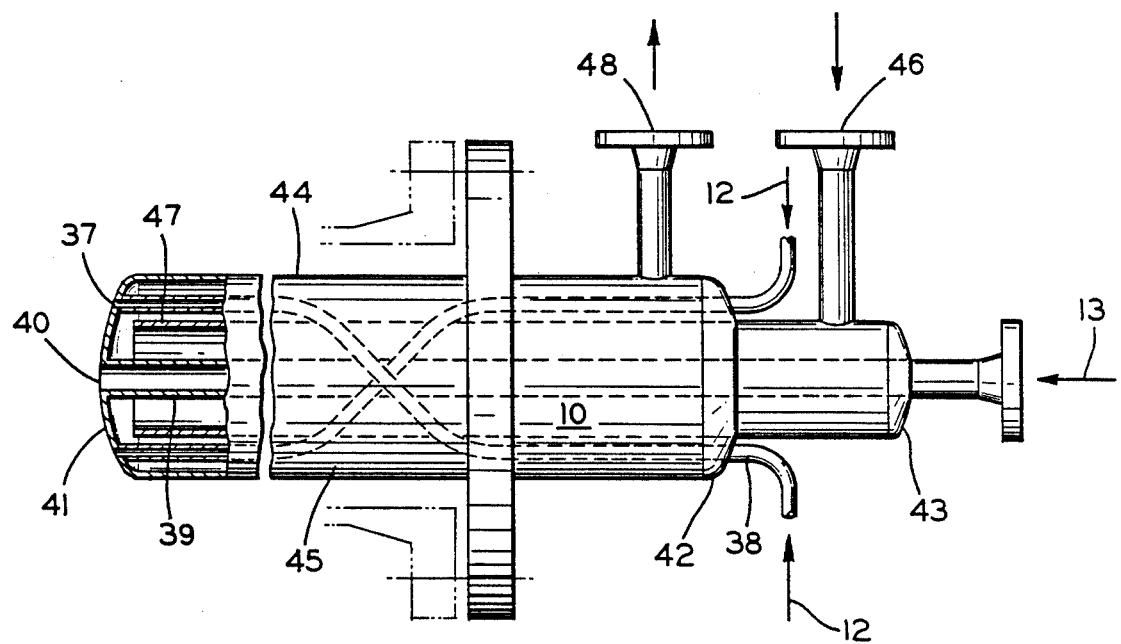
FIG. 5 is a sectional drawing of an inlet device according to the present invention.

FIG. 5 shows the components to the inlet device 10. Lines 38 for oxidizers 12 are separately installed in inlet device 10 and connected to nozzles 37. This applies also to line 39 for the second stream of hydrocarbons 13 which is connected to nozzle 40. The lines 38 and 39 extend inside a tubular shell 44 and are welded to a head 41 with the nozzles 37 and 40 respectively pointing towards mixing chamber 9. The lines 37 enter the shell 44 through and are welded to a head 42 and the line 39 enters the shell through and is welded to a head 43. The space between shell 44, said heads and the feed lines constitutes a chamber 45 cooled with water. The cooling water enters via a flange 46 and flows through a partition plate 47 to the head 41, which has the high ®st temperature, and is discharged via a flange 48. The partition plate 47 is tubular with an open end adjacent the head 41 and an opposite end closed by the head 43. The partition plate 47 is coaxial with and surrounds the line 39. A portion of the plate 47 which extends between the heads 42 and 43 is connected to the flange 46. The remainder of the plate 47 44 is connected to the flange 48.

a vessel for the generation of synthesis gas according to the present invention, for example with a capacity of 6634 m³/h of CO+H₂ has the following main dimensions:

| | |
|---|---|
| Inside diameter of reformer section (1) | 800 mm |
| Length of reformer section | 10,000 mm |
| Number of reformer tubes (6) | 19 |
| Diameter of enveloping circle (11) | 750 mm |
| Reynolds number for outlet of reformer tubes | 97,000 |
| Inside diameter of oxidation section (2) | 1,000 mm |
| Length of mixing chamber (9) | 2,200 mm |
| Distance h (reformer tube end to plane of inlet devices) | 600 mm |
| Number of inlet devices | 6 |
| Angle alpha (34) | 15° |
| Angle beta (36) | 0° |
| Reynolds number | 260,000 |

Tables 1 and 2 show the operating data for the vessels according to FIGS. 1 and 2. The columns are headed by the reference numbers used for the components in the figures.

TABLE 1

| | 3 | 7 | 12 | 13 | 23 |
|---|---|---|---|---|---|
| CO [Mol. %] | | 4.82 | | | 23.64 |
| CO₂ [Mol. %] | | 10.07 | | | 6.93 |
| H₂ [Mol. %] | | 54.75 | | | 67.33 |
| CH₄ [Mol. %] | 96.74 | 28.88 | | 96.74 | 0.96 |
| N₂ [Mol. %] | 3.26 | 1.48 | 0.5 | 3.26 | 1.14 |
| O₂ [Mol. %] | | | 99.5 | | |
| $V_{dry\ gas}\ \frac{kmol}{h}$ | 63.66 | 140.68 | 51.192 | 42.44 | 325.5 |
| $V_{H2O}\ \frac{kmol}{h}$ | 153.96 | 118.84 | | | 133.77 |
| Temperature [°C.] | 370 | 730 | 200 | 370 | 613 |
| Pressure [bar] | 43 | 41 | >41 | >41 | 40 |

TABLE 2

| | 3 | 7 | 12 | 13 | 23 |
|---|---|---|---|---|---|
| CO [Mol. %] | | 4.82 | | | 23.83 |
| CO₂ [Mol. %] | | 10.07 | | | 6.89 |
| H₂ [Mol. %] | | 54.75 | | | 67.61 |
| CH₄ [Mol. %] | 96.74 | 28.88 | | 96.74 | 0.54 |
| N₂ [Mol. %] | 3.26 | 1.48 | 0.5 | 3.26 | 1.13 |
| O₂ [Mol. %] | | | 99.5 | | |
| $V_{dry\ gas}\ \frac{kmol}{h}$ | 62.77 | 138.72 | 51.136 | 41.85 | 323.84 |
| $V_{H2O}\ \frac{kmol}{h}$ | 151.81 | 117.18 | | | 131.79 |
| Temperature [°C.] | 370 | 730 | 200 | 370 | 614 |
| Pressure [bar] | 43 | 41 | >41 | >41 | 40 |

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an essentially cylindrical vessel for the generation of synthesis gas at relatively high pressure utilizing hydrocarbons, including a first wall portion defining a catalytic endothermic reforming section, a plurality of reformer tubes having outlet ends, the reformer tubes capable of being heated externally and being filled with a catalyst, the reformer tubes mounted within the reforming section and extending parallel to the longitudinal axial direction of the vessel, an inlet nozzle opening into the first wall portion for introducing a mixture of hydrocarbons and steam into the vessel such that the mixture flows through the reformer tubes, whereby reforming gas is generated in the reformer tubes, an outlet nozzle defined in the first wall portion, a second wall portion adjacent the first wall portion, the second wall portion having a greater diameter than the first wall portion, an end wall connected to the second wall portion, the second wall portion and the end wall defining a pressure chamber forming a partial oxidation section, the outlet ends of the reformer tubes opening into the partial oxidation section, the partial oxidation section serving for mixing the reforming gas with additional hydrocarbons and oxygen or oxigen-rich gas, the improvement comprising a plurality of inlet devices for the hydrocarbons and oxygen or oxygen-rich gas, the inlet devices each defining an axis and mounted in the second wall portion, the axes of the inlet devices extending at an angle α relative to the radial direction of the vessel and the axes of the inlet devices extending transversely of the axial direction of the vessel at an angle β ranging from parallel with to inclined to a radial plane of the vessel, the inlet devices axially spaced from the outlet ends of the reformer tubes and from the bottom wall of the vessel, whereby the gases in the partial oxidation section are conducted in a rotating pattern in circumferential direction of the vessel and in a loop-shaped pattern in axial direction of the vessel, such that the gases are conducted from the center of the partial oxidation section toward the bottom wall and then toward the lower wall portion, so that the gases flow upwardly along the lower wall portion toward the reforming section where the gases heat the reformer tubes and subsequently leave the vessel via the outlet nozzle.

2. The vessel according to claim 1, wherein the improvement further includes that the partial oxidation section has an axial length selected in such a way that the minimum dwell time of the glass is 4 seconds.

3. The vessel according to claim 1, wherein the inlet nozzle has a plurality of nozzle openings.

4. The vessel according to claim 1, wherein the angle α ranges from 1° to 30°, the angle β with the radial plane ranges from +5° to −15°, and an axial distance h from the ends of the inlet devices to the outlet ends of the reformer tubes is in the range of 0.15 to 1.0 times the diameter of a circle enveloping the reformer tubes.

5. The vessel according to claim 4, wherein the angle α ranges from 5° to 20° and the angle β ranges from 0 to −10°.

6. The vessel according to claim 4, wherein the improvement further includes that outlet end of the reformer tubes has an internal diameter d, and all gas outlet openings define a maximum pitch t, the distance h, the diameter d, and the maximum pitch t complying with the following requirement:

t is less than or equal to d +(0.317×h)

7. The vessel according to claim 1, wherein the improvement furhter includes that the Reynolds number for the flow conditions of the gas streams the outlet ends of the reformer tubes is at least $5 \times 10^3$.

8. The vessel according to claim 7, wherein the improvement further includes that the Reynolds number for the flow conditions of the gas streams the outlet ends of the reformer tubes is greater than $5 \times 10^4$.

9. The vessel according to claim 1, wherein the improvement further includes that Reynolds number for the flow conditions in the inlet devices is greater than $4 \times 10^3$.

10. The vessel according to claim 9, wherein the improvement further includes that Reynolds number for the flow conditions in the inlet devices is greater than $4 \times 10^4$.

11. The vessel according to claim 1, wherein the improvement further includes that partial oxidation section has an internal diameter which is at least 1.1 times the diameter of a circle enveloping the reformer tubes.

12. The vessel according to claim 11, wherein the improvement further includes that the internal diameter of the partial oxidation section is a maximum of two times the diameter of the enveloping circle.

13. The vessel according to claim 1, wherein a catalyst for a catalytic steam reforming step is mounted near the outlet ends of the reformer tubes such that the ends of the reformer tubes penetrate the catalyst.

14. The vessel according to claim 13, wherein the catalyst is supported by a layer, the layer serving additionally to facilitate transfer of the heat of the gases onto the reformer tubes so that an adequate cooling time is ensured.

15. The vessel according to claim 11, wherein the layer is a packing.

* * * * *